United States Patent
Parker

[11] 3,961,308
[45] June 1, 1976

[54] OIL AND GAS WELL DISASTER VALVE CONTROL SYSTEM

[75] Inventor: William H. Parker, Hurst, Tex.

[73] Assignee: Del Norte Technology, Inc., Euless, Tex.

[22] Filed: Oct. 2, 1972

[21] Appl. No.: 294,289

[52] U.S. Cl. .............................. 340/18 NC; 166/72; 175/48; 340/239 R
[51] Int. Cl.² ...................... G01V 1/14; E21B 35/00
[58] Field of Search ................... 340/18 NC, 239 R; 181/105; 175/48; 324/5, 6; 73/194 B, 194 A, 194 RM; 166/72

[56] References Cited
UNITED STATES PATENTS

| | | |
|---|---|---|
| 3,115,774 | 12/1963 | Kolb .............................. 340/18 NC |
| 3,588,804 | 6/1971 | Fort ................................ 340/18 NC |
| 3,739,845 | 6/1973 | Berry et al. ........................... 166/72 |
| 3,790,930 | 2/1974 | Lamel et al. .................... 340/18 NC |
| 3,850,237 | 11/1974 | Ahlstone et al. ...................... 166/72 |

*Primary Examiner*—Nelson Moskowitz

[57] ABSTRACT

A signal is transmitted through the walls of tubing extending down into an oil well in order to control a disaster valve at the lower end of the tubing. If the signal disappears, the valve shuts. In one embodiment, the tubing functions as the core of a transformer. In another embodiment, the tubing conducts an acoustic signal.

7 Claims, 5 Drawing Figures

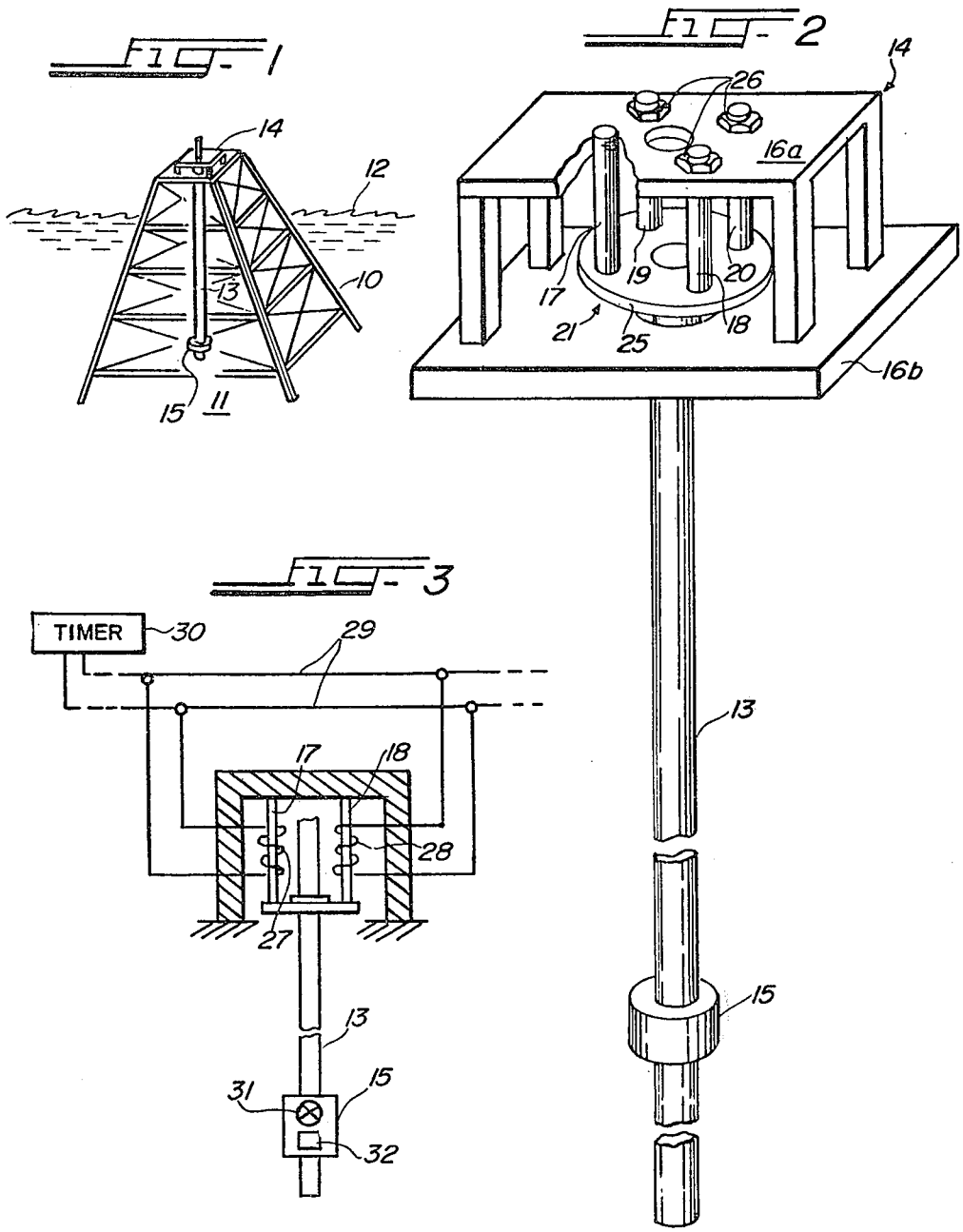

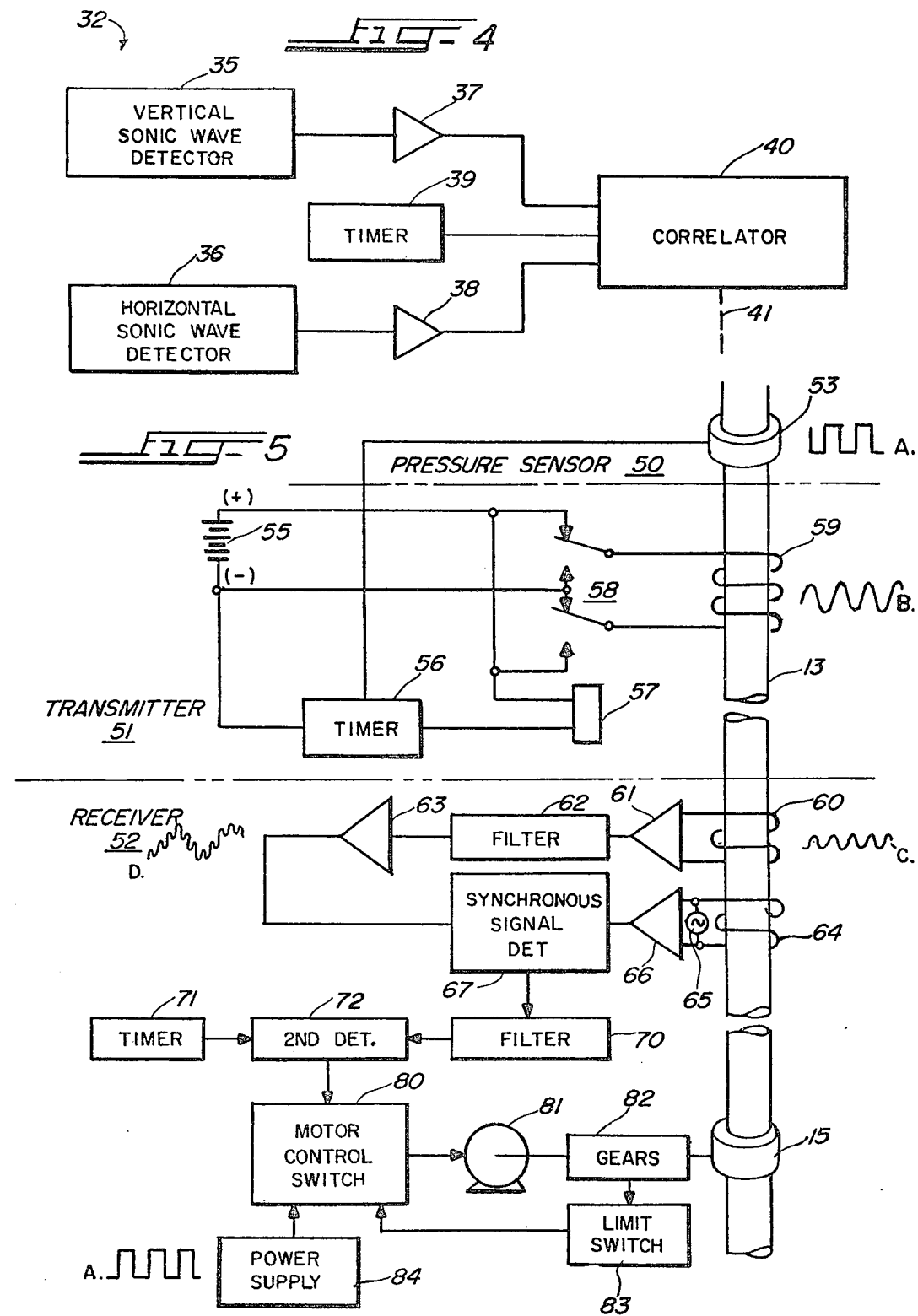

OIL AND GAS WELL DISASTER VALVE CONTROL SYSTEM

This invention relates to the control of valves and other devices especially — although not exclusively — associated with an oil well pipe line or tubing and more particularly to systems for controlling valves which must be shut in times of disaster.

The problem of oil well flow control has recently been a subject matter of great public concern. One reason for this concern is the widely publicized spills wherein underwater oil wells leak into the ocean. The crude oil flows to the ocean surface, kills wildlife, ruins beaches, and provokes public outcry. One solution to these oil spill problems is to place a disaster valve over the mouth of the well. If there is a disaster or runaway condition, the valve closes, and not oil or gas can thereafter leave the well.

The usual approach is to extend a communication line or duct down the pipe to control the valve. The line or duct might be hydraulic, pneumatic, or electric. One trouble is that the oil spill might be caused by a natural disaster such as storm, fire, or the like. If so, the line is very likely to be broken or otherwise rendered inoperative responsive to the same disaster that breaks the pipe leading to the spill. To overcome these problems, some have placed the duct inside the pipe or tube. However, the installation and removal of this duct is troublesome, hinders cleanout, and it may become entangled in a manner which actually prohibits the valve control.

Accordingly, there is a need for a fail-safe system and method of controlling disaster valves at the bottom of a well. The system should function equally well without regard as to whether the valve is remotely located, far down inside a borehole, or deep under the sea.

Therefore, an object of the invention is to provide a new and improved system for controlling valves and other devices at the bottom of an oil pipe line. Here an object is to provide a fail-safe method of controlling the valves or other devices even if the pipe line is completely broken and all communication is lost between the valve and the top of the well.

Yet another object of the invention is to eliminate the need for all separate communication lines or ducts. Here an object is to use the device actually being monitored (i.e., the pipe line or tubing) as the communication channel so that communications are as reliable as the monitored device.

Another object of the invention is to improve maintenance and reduce costs by eliminating ducts inside the tubing. In this connection, an object is to eliminate the cost of extending extra communication lines for transmitting control signals.

In keeping with an aspect of this invention, the walls of the tubing are used as a communication line. A pressure sensing device at the top of a well detects any abnormal change pressure. Responsive thereto, a signal in the tubing is used to shut down the flow of gas or oil by closing a valve. In one embodiment, a coil is wound around the tubing to generate magnetic flux therein, much as is done by the primary in a transformer. The flux change is detected by another coil wound around the tubing at the bottom of the well. In another embodiment, a magnetostrictive element is used as a transducer at the top of the tubing. The element stretches the tubing slightly and then allows it to snap back, thereby conveying an acoustic ping down the well. In either embodiment, it is preferably to use the existance of a signal as a normal condition indicator so that an absence of the signal causes the valve to shut. This way, a broken tube results in a disaster signal for closing the valve.

The nature of these embodiments may become more apparent from a study of the attached drawings wherein:

FIG. 1 schematically shows an exemplary off-shore oil well tower with tubing extending down to a disaster valve at the ocean floor;

FIG. 2 is a schematic and perspective view of the pertinent parts of the tower of FIG. 1, showing an embodiment employing an acoustic signal;

FIG. 3 is a schematic showing of the electrical transducer element used in FIG. 2;

FIG. 4 is a block diagram of a detector circuit at the bottom of the well used to detect the acoustic signal generated by the transducer of FIG. 3; and FIG. 5 is a combined showing of an oil well pipe or tubing and a block diagram of an electrical system for controlling a disaster valve at the bottom of the well.

By way of example, FIG. 1 shows a tower 10 resting on the ocean floor 11 with the top 14 projecting above the surface 12 of the ocean. A pipe or tubing 13 extends vertically from the tower top 14, through the tower structure 10 to the ocean floor 11. Control equipment on the top 14 of the tower controls the pumping and flow of the oil or gas through the tubing 13. On the bottom end of the tubing 13, a disaster valve 15 is adapted to shut down the flow of oil or gas.

This showing of an off-shore tower 10 is symbolically exemplary of almost any well drilling and pumping equipment. Therefore, references hereinafter to towers, off-shore rigs, etc. are to be construed broadly enough to cover any and all suitable oil conveying equipment. Some of the pipes and tubing may be many thousand feet long.

The problem exemplified by this oil tower 10 is one of controlling disaster valve 15 from control equipment at the top 14 of the tower.

In FIG. 2, the tubing 13 may be a string of sections extending from control equipment at tower top 14, downwardly many thousands of feet to a disaster valve 15. The control equipment includes a table-like structure 16a resting or a platform 16b supported by the tower structure. A group of magnetostrictive rods 17–20 are suspended from the top of the table. While four rods 17–20 are here shown, any suitable number of rods may be provided, such as four, six, eight, ten or more rods. Each rod may be made of nickel, perhaps an inch or so in diameter and in the order of four feet long.

The weight of tubing 13 hangs from these rods, thereby tending to stretch or tension them. Since the lower end of the tubing 13 extends down into the earth and the upper end is hanging upon rods 17–20 in an unrestrained manner, the intermediate tubing is free to move or stretch at least a few thousandths of an inch.

A transmitting transducer 21 is adapted to send sonic energy signals down the tubing 13. In greater detail, the top of the tubing 13 terminates in a flange 25 which is supported by the magnetostrictive rods 17–20. While any suitable attachment means may be used, the rods are here shown as being threaded at either end. Large nuts 26 are turned onto the threaded ends. A coil such as 27, 28 surrounds each of the rods. Each coil is selectively energized or deenergized simultaneously responsive to current in a common circuit 29. The coils are electrically insulated wire wrapped — in the magnetic sense — in a series aiding manner.

A timer 30 energizes the common circuit wires 29 at accurately timed intervals. The resulting electrical currents create magnetic fields in the magnetostrictive rods 17–20 which cause them to contract or shrink and to lift or stretch the tube. When the timer 30 removes the electrical signal from the wires 29, the magnetic field collapses in the magnetostrictive rods. Responsive thereto, the rods lengthen and the tubing 13 is released. This stretching and relaxing of the tubing 13 transmits pings or pulses of acoustic energy down the pipe walls.

The pulses of sonic energy travel down the tube at a fixed velocity and with a known transmission characteristic. The principal energy travels in a compression or p-wave mode. As the energy travels, transverse vibration occurs to cause a second sonic energy wave front traveling in the tubing at a slower velocity. Therefore, each sonic energy pulse transmitted responsive to the output of timer 30 arrives at the bottom of the tubing in form of two sonic energy pulses displaced from each other in time by a predetermined period of time. On the other hand, random noise will not occur with the same predictable timing differential.

Means are provided at the bottom of the tubing for detecting the sonic energy transmitted from the top of the tubing. In greater detail, the disaster valve 15 comprises a mechanical valve 31 for shutting down the flow from the well and an electronic control package 32 for selectively opening and closing the valve.

The electronic package 32 is constructed, as shown in FIG. 4. More specifically, a first receiving transducer 35 detects the principal compression or p-wave of sonic energy traveling down the tubing as a direct result of the ping of acoustic energy developed when the tube is stretched and relaxed. A second receiving transducer 36 detects the secondary horizontal or transverse wave of sonic energy traveling down the tube. The outputs of these two detectors are amplified at 37, 38.

A local timer is adjusted to operate at a pulse repetition rate which is a function of the pulse repetition rate of the timer 30, thereby providing an axis of reference. Preferably, the timer 39 locks into self-synchronism responsive to the timing of uniformly spaced pulses received down the tubing. A correlator 40 compares the outputs of the timer 39 and of the two receiving transducers 35, 36.

Noise in the tubing wall will not have any fixed relationship to the system timing. Thus, noise does not cause the timer 39 to repeatedly receive energy at fixed intervals. The natural resonance of the described system may be put at about 2,000 Hz, which does not match any other source of acoustic energy in an oil field. Therefore, timer 39 will not lock into synchronism with random noise or with vibrations caused by pumps, drills, or the like. Random noise does not cause the correlator 40 to receive three signals which compare with the system signals. Hence, noise is rejected. To further promote noise isolation, the correlator may have an electronic gate which closes between timer pulses to preclude response to any signals received between standard time intervals.

As long as sonic energy pulses continue to travel down the tubing at fixed intervals, the correlator output at 41 holds the valve 31 open. If the transmitting transducer (rods 17–20, coils 27, 28, and wires 29) ceases to transmit sonic energy to the disaster valve 15, it shuts. Therefore, even if the tubing should break into tiny pieces, the valve 31 will shut. Moreover, if desired, the valve may be a spring loaded device which snaps shut when a power source is removed. Therefore, it is a fail-safe device. To further insure against faulty valve response, the circuit may be adjusted to require perhaps ten (for example) successive pulses before enabling the valve to open, but a loss of only two (for example) successive pulses to close the valve.

A similar system is shown in FIG. 5 except that the energy pulses are sent down the tubing 13 in the form of magnetic flux changes. The major elements of this electrical system are a pressure sensor system 50, a transmitter 51, and a receiver 52. The sensor 50 includes any suitable device 53 which responds to abnormal pressure changes — either too low or too high, as desired. In its simplest form, this sensor could be an oil pressure gauge which gives signals when the "needle" moves out of a predetermined zone. Other and preferred devices are known to those who are skilled in the art.

The transmitter 51 comprises a source 55 of D.C. power, a timer 56, a relay 57, polarity reversing contacts 58, and a primary winding 59 on the tubing 13. The timer 56 may operate at about 3 Hz, for example. The primary winding 59 may have in the order of 400 to 1,000 turns.

As long as the sensor 53 detects normal oil pressure in tubing 13, timer 56 operates to send periodic control signals to relay 57. When relay 57 is released, the top of primary winding 59 is positive (+) and the bottom is negative (−). When relay 57 is operated, these polarities are reversed so that the top of the primary winding 59 is negative (−) and the bottom is positive (+). Thus, a square wave signal A appears in primary winding 59.

The walls of tubing 13 function as the core of a transformer functions. Therefore, a reversing D.C. signal A in primary winding 59 causes an A.C. signal B to be induced in secondary windings by the core flux changes.

The receiver 52 comprises a secondary transformer winding 60 which acts as a detector coil for the flux changes. This winding may have approximately 10,000 turns. The winding is connected to drive, in cascade, amplifier 61, a filter 62, and a second amplifier 63.

Another secondary winding 64 on the tubing core 13 is driven by an oscillator 65 at a predetermined frequency (signal C), such as 200 Hz. This same 200 Hz signal is also applied through an amplifier 66 to a synchronizing signal detector 67. In the tubing core 13, the 3 Hz flux changes sent down the well tubing 13 mix and combine with the 200 Hz flux changes generated locally to produce signal D. The 3 Hz changes may be transmitted over greater distances. The 200 Hz changes are easier to amplify and process electronically. They avoid reciprocal frequency problems (1/F) inherent in low frequency amplifiers. Therefore, the signal D passing through filter 62 is a combination of wave forms B and C, having a frequency in the order of 195 Hz to 205 Hz. This signal is applied to the other side of the synchronism signal detector 67.

The locally generated 200 Hz signal is canceled in the detector 67 so that only the 3 Hz signal is transmitted to the filter 70. A locally operated timer 71 has a synchronized output which is a function of the output of the timer 56. Therefore, detector 72 gives an output signal when the signals of timer 71 and filter 70 coincide. The detector 72 may have any suitable form such as a narrow band locked-loop detector, which discriminates against unwanted frequencies.

In either embodiment of the invention (FIG. 2 or FIG. 5), there is a motor control switch 80 for driving a motor 81 to close a valve via a gear train 82. Limit switches 83 are built into the system so that it knows whether the valve is opened or closed. This conserves the power of batteries in a power source 84 at the bottom of the well. A suitable low power signal may close the valve whenever the power supply 84 approaches exhaustion.

A moments reflection will reveal the advantages of the invention. There is immunity from noise, and no dependence upon extra ducts or transmission lines down the well. The transmission line is the tubing which carries the oil. Thus, the valve control signal transmission line is as reliable as the oil duct. If any disaster should sever communications down the well, the valve closes.

Those who are skilled in the art will readily perceive other modifications. Therefore, the appended claims are to be construed to cover all equivalent structures which fall within the true scope and spirit of the invention.

I claim:

1. A system for communicating into an oil or gas well comprising a gas or oil tubing extending down into said well, transmitting sonic energy transducer means near one end of said tubing for distinctively activating said tubing walls with sonic energy to transmit signals to the walls of said tubing, said transducer comprising magnetostrictive means for supporting the weight of said tubing, wherein said magnetostrictive means comprises a plurality of nickel rods having coils thereon, means for periodically energizing said coils to change the length of the nickel rods thereby lifting and lowering said supported tubing, means near the other end of said tubing for detecting the signals transmitted through said walls, and means responsive to said detection of said signals for performing a control function near said other end of said tubing.

2. The system of claim 1 wherein said transducer comprises magnetostrictive means for supporting the weight of said tubing and includes means for generating compression waves in the walls of said tubing.

3. The system claim 1 and said means near said other end comprising means for comparing sonic energy transmitted through said tubing wall in at least two different modes in order to detect said energy and discriminate against noise.

4. The system of claim 1 wherein said transmitting means comprises said sonic energy transducer means for distinctively activating said pipe walls with said sonic energy by periodically stretching and relaxing said pipe.

5. The system of claim 1 wherein said tubing terminates at one end in an integral flange extending perpendicularly from said pipe wall, said transducer comprising said magnetostrictive nickel rods being attached to said flange for supporting the weight of said pipe, said coils on said rods energizing and deenergizing said rods to cause them to stretch and relax thereby stretching and relaxing said pipe to send a ping of sonic energy through the walls of said pipe, said means near said other end of said pipe comprising means for comparing the timing of sonic energy transmitted through said tubing in at least two different modes with a locally generated timing signal in order to detect said sonic energy and discriminate against noise.

6. A system for communicating into an oil or gas well comprising a gas or oil tubing extending down into said well, transmitting means near one end of said tubing and comprising a primary winding of a transformer, whereby said tubing wall acts as a transformer core, said detecting means near the other end comprising a secondary winding on the tubing which acts as a core of said transformer responsive to flux changes induced in said tubing wall, bias means comprising a third winding on said tubing core for generating flux which mixes with and alters the frequency of signals induced in said secondary winding, and means responsive to said detection of said signals for performing a control function near said other end of said tubing.

7. The system of claim 6 and means for filtering said altered frequency to restore the signal transmitted through said tubing casing.

* * * * *